May 14, 1935. J. L. ANDERSON 2,001,294
METAL CUTTING MACHINE
Filed Oct. 21, 1932 4 Sheets-Sheet 3

James L. Anderson INVENTOR
BY ATTORNEY

May 14, 1935.  J. L. ANDERSON  2,001,294
METAL CUTTING MACHINE
Filed Oct. 21, 1932  4 Sheets-Sheet 4
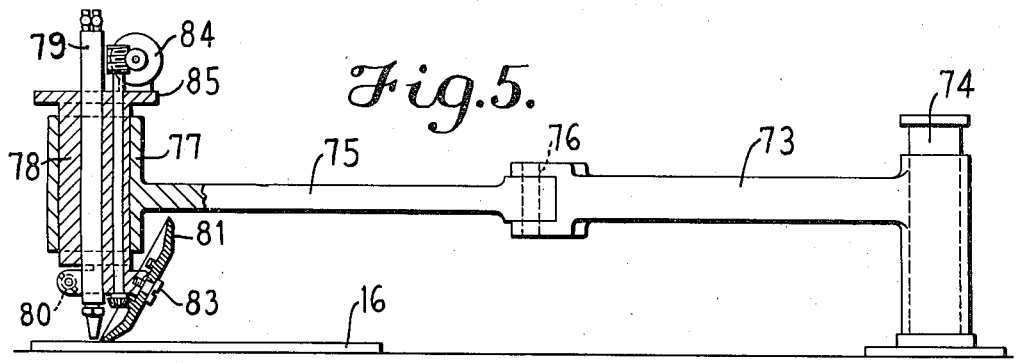
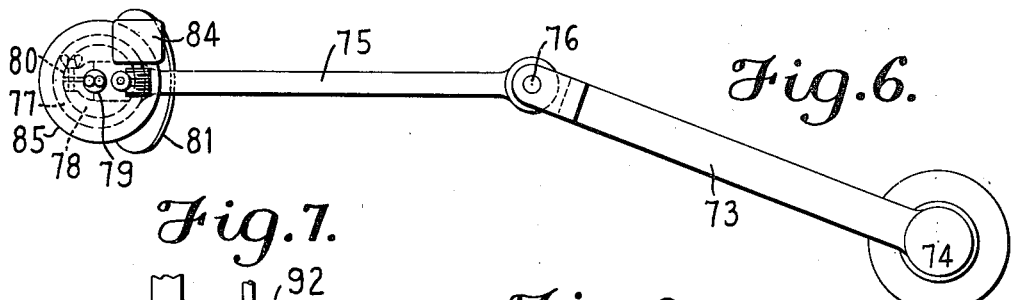
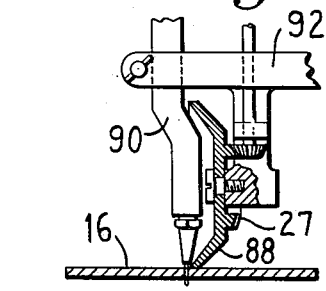
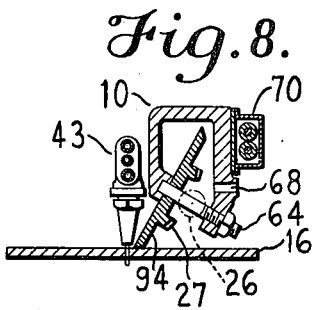
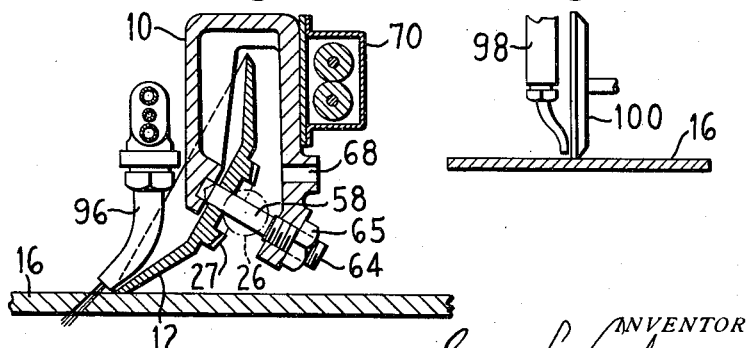

Patented May 14, 1935

2,001,294

UNITED STATES PATENT OFFICE 2,001,294

METAL CUTTING MACHINE

James L. Anderson, Closter, N. J., assignor to Air Reduction Company, Incorporated, New York, N. Y., a corporation of New York Application October 21, 1932, Serial No. 638,836

15 Claims. (Cl. 266—23)

This invention relates to dirigible gas cutting apparatus, and more especially to motor-driven apparatus, in which the cutting torch is connected at one side of a wheel that rolls upon the metal to be cut. An object of the invention is to make it possible, with a simple, compact equipment, to perform clean, economical, continuous and accurate cutting along any intended line, regular or irregular, and, in particular, to make it possible to guide and propel the oxygen jet so as to cut desired shapes having curves of short radii or even substantially sharp corners. This is accomplished by so relating the torch and the dirigible wheel that the tip end of the torch may be immediately adjacent and beside the point of tangency of the wheel with the surface of the work. Thus, the wheel will travel practically or very nearly on the edge of the kerf at the point where the oxygen jet is acting, and consequently, when the wheel is turned in any direction or to any degree the direction of cutting is changed in the same manner.

In former devices in which there was a torch abreast of a wheel, the torch and wheel were spaced, with the result that such devices could be used for straight-line cutting or to make cuts involving curves of relatively long radii, but were not serviceable for difficult operations. If the wheel moved in a curve convex to the torch, the jet cut a curve of longer radius and advanced at greater speed than the wheel, but if the wheel moved in a curve concave to the torch the jet cut more slowly a curve of shorter radius. If the wheel was steered sharply in one direction, the cutting jet would not move immediately in the new direction to cut a corner, but would describe a comparatively wide arc corresponding to the distance between the tip and the point of traction, and, incidentally, would have to travel so rapidly in doing so that the cut might be lost, whereas if the wheel was turned abruptly in the opposite direction the cutting jet would be moved through a reverse loop. In any very special cutting operation the path of the cutting agency, namely the oxygen jet, would differ materially from the path of the wheel, so that it was impossible by guiding the wheel over the work to cause the jet to cut a given shape with any degree of accuracy. By virtue of the feature of the present invention which has been mentioned, the direction of cutting can be changed either right or left with substantial accuracy, and the wheel is made serviceable as a tracing wheel.

Devices embodying the invention may have a single wheel, or there may be additional rolling supports. As disclosed herein, the invention is applicable to small portable devices, or motorized torches, and is also applicable to machines in which a torch and driving wheel unit is carried or laterally supported by a suitable stabilizing frame which is mounted for universal movement in a plane.

Other aspects of the invention are applicable to straight-line or long radius cutting, for which purposes it is not necessary to dispose the wheel and torch in immediate juxtaposition. It is, therefore, to be understood that the invention includes novel features and combinations relating to motor-driven torch carriages and to machines of the character indicated, whether the wheel travels on the edge of the kerf or not.

Other objects, features and advantages of the invention will appear or be pointed out as the specification proceeds.

In the accompanying drawings, forming a part hereof:

Fig. 5 is a diagrammatic side elevation, on a reduced scale and partly in section, showing a modified form of the invention, in which the torch is carried by a pivoted arm;

Fig. 6 is a plan view of the apparatus shown in Fig. 5;

Fig. 7 is a diagrammatic view, partly in section, of another modified form of the invention;

Fig. 8 is a sectional view corresponding to Fig. 4, but on a reduced scale and showing the machine equipped with an inclined flat disk wheel;

Fig. 9 is a sectional view similar to Fig. 4 but on a reduced scale and showing a cutting torch for making a bevel cut in place of the perpendicular cut of Fig. 4; and Fig. 10 is a reduced diagrammatic view showing an upright disk wheel and a machine torch with the tip offset to bring the cutting jet close to the wheel.

Figure 1:
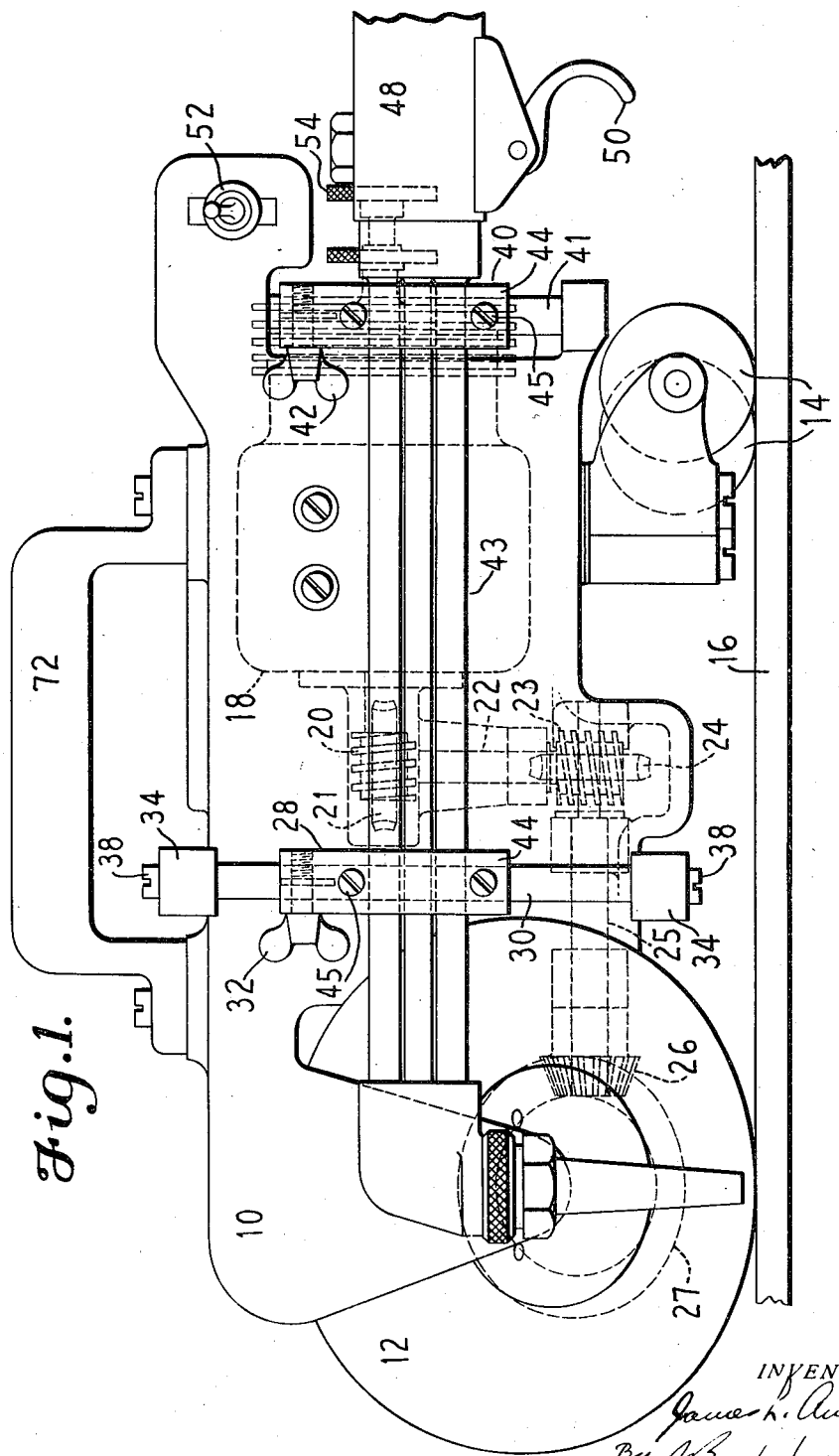
Fig. 1 is a side elevation of a torch and motorized carriage made in accordance with this invention.

In Figs. 1–4 a carriage 10 is supported by a driving wheel 12, and two other wheels 14, the latter being pivotally connected to the carriage so that they caster. These wheels 12 and 14 run on the surface of the work 16. A motor 18 on the carriage is operatively connected with the driving wheel 12 through driving connections which include a worm gear 20 on the motor shaft operating a worm wheel 21 on a vertical shaft 22, and a worm gear 23 on the lower end of the shaft 22 engaging a worm wheel 24 on a horizontal drive shaft 25 which has a bevel gear 26 engaging a bevel gear 27 secured to the driving wheel 12.

Figure 2:
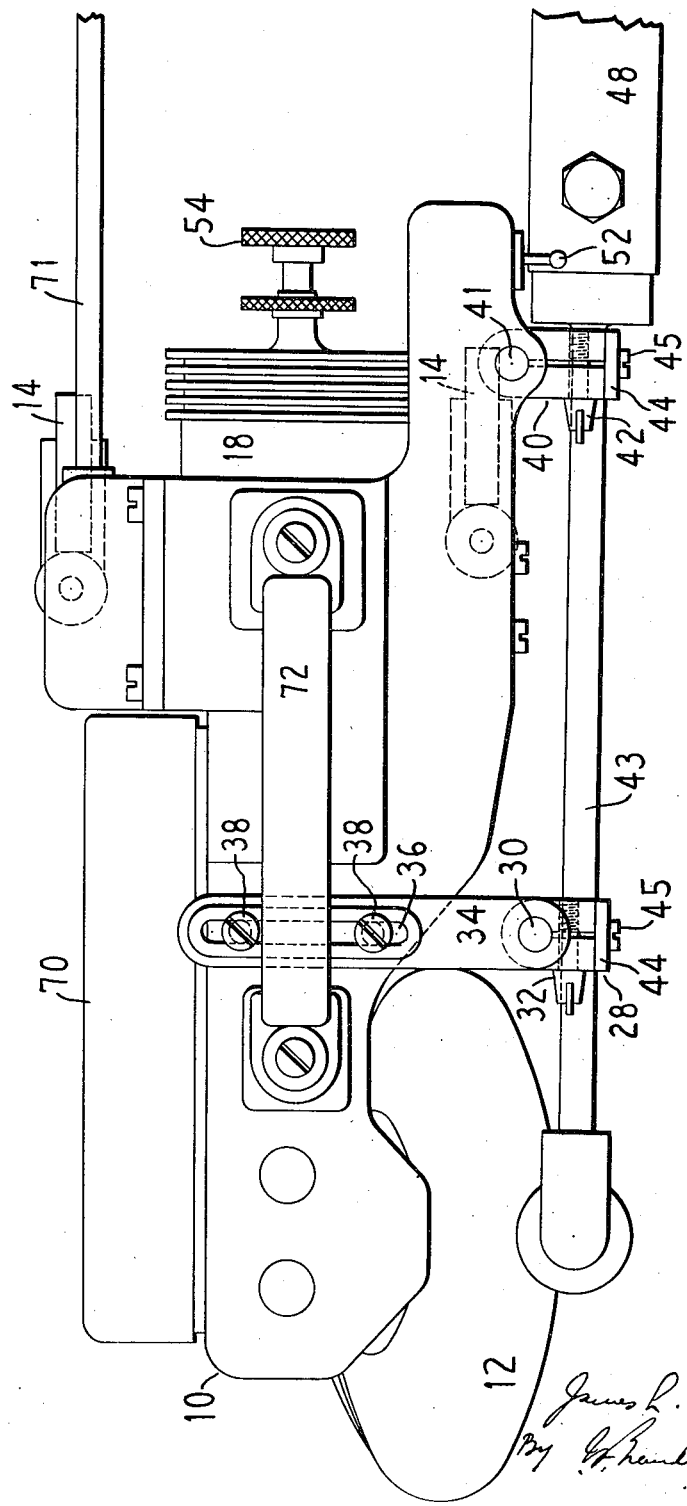
Fig. 2 is a top plan view of the torch and carriage shown in Fig. 1.

A torch holder 28 is clamped to a vertical rod 30 by a thumb-screw 32. When the screw 32 is released, the torch holder 28 can be moved along the rod 30 for vertical adjustment, or can be turned about the axis of the rod. The upper and lower ends of the rod 30 are connected to brackets 34, each of which has a slot 36 (Fig. 2). Screws 38 extend through the slots 36 and thread into the carriage to connect the brackets 34 to the carriage.

Another torch holder 40 is clamped to a vertical rod 41 by a thumb-screw 42. This torch holder 40 is adjustable vertically and angularly on the rod 41.

Each of the torch holders 28 and 40 is recessed to receive a torch 43, and cover plates 44 are fastened to the torch holders by screws 45 to hold the torch fast in the torch holders.

The torch 43 discharges a cutting jet of oxygen against the work 16 adjacent the point of contact of the driving wheel 12 on the work. The screws and slotted brackets 34 comprise means for adjusting the torch holder 28 and the torch 43 transversely of the carriage to bring the cutting jet into the desired position with respect to the driving wheel 12. Such adjustment is provided because of variations in the different torches and tips which can be used with the carriage.

The carriage is guided by a handle 48, which is a part of the torch in the preferred embodiment of the invention, but may be connected to the carriage in other ways if desired. The operation of the torch is controlled by a trigger 50, in a well understood manner. The power to the motor is controlled by a snap switch 52, and the speed of the motor is controlled by a governor adjustment 54. These manual controls for the torch and motor are all located within reach of a hand holding the handle 48, so that an operator guiding the torch across the work can operate the trigger 50, switch 52 or governor adjustment 54 without releasing the guiding handle.

Figure 3:
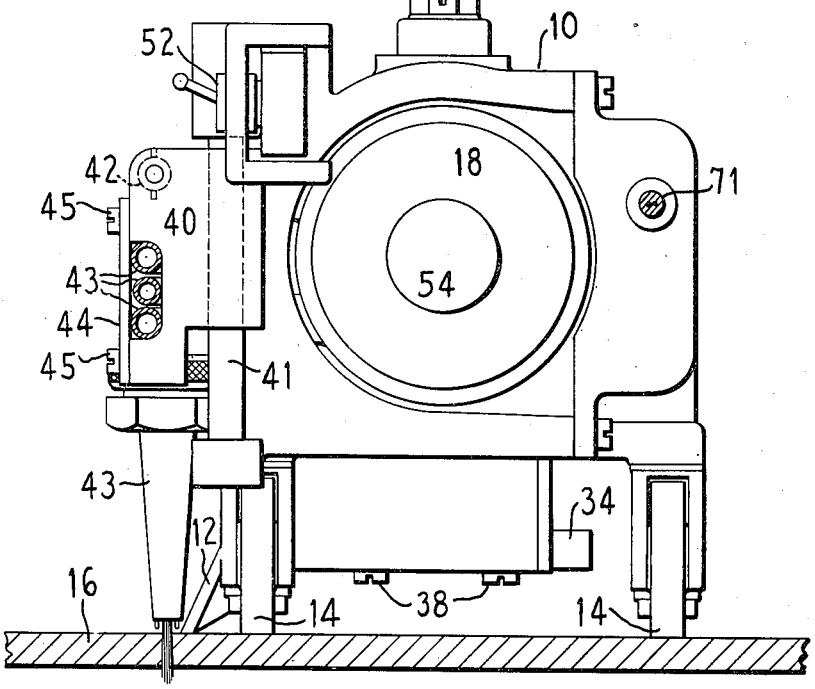
Fig. 3 is a rear elevation of the apparatus shown in the preceding views.

Fig. 3 shows the rearward end of the carriage, the torch being in section. The work is also shown in section with the cutting torch in operation.

Figure 4:
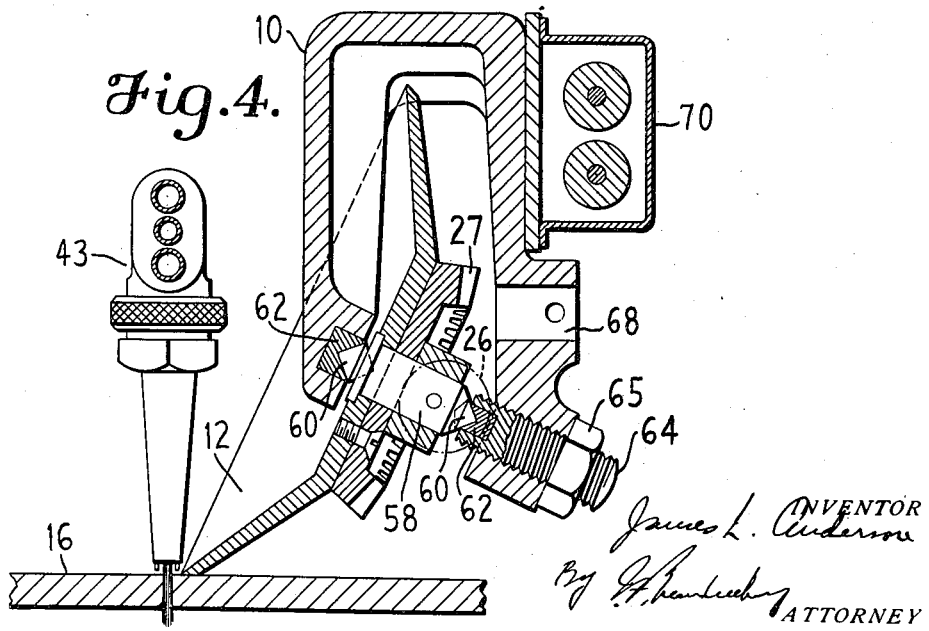
Fig. 4 is a section on the line 4—4 of Fig. 1.

In Fig. 4 the wheel 12 is shown rigidly connected to an axle 58 having conical ends 60 welded to the axle and made of hard material which retains its hardness under extreme heat. Stellite is a suitable material. These conical ends 60 run in bearings 62 of similar material. The bearings 62 are located so that they hold the axle inclined toward the torch. Play in the axle bearings can be taken up by a screw 64 which holds the lower bearing 62 and threads into the frame of the carriage. A lock nut 65 holds the screw 64 in set position.

The inclined axle 58 causes the driving wheel 12 to slope so that its bottom portion extends close to the torch. The driving wheel 12 is dished, and this form of wheel has two important advantages. The wheel does not become misshaped through warping caused by the heat from the torch, and the recess within the dished wheel provides space into which a torch can extend when using torches which require such space, as the bevel cutting torch shown in Fig. 9.

The carriage frame has a socket 68 for receiving a radius rod so that the machine can be guided about a center for circle cutting. Resistance coils for the motor 18 are contained in a housing 70 extending along one side of the carriage. An electric cable 71 supplies power to the motor. The machine is carried by a handle 72 rigidly connected to the carriage frame.

Figs. 5 and 6 show a modified form of the invention in which an arm 73 is pivotally connected to a pillar 74. A second arm 75 is connected to the arm 73 by a pivotal bearing 76. The outer end of the arm 75 has a vertical bearing sleeve 77 in which a torch holder 78 is slidably and rotatably contained. A torch 79 is clamped to the torch holder by a split clamp 80, and the torch is held in proper spaced relation to the work 16 by a driving wheel 81 which runs on the work.

The driving wheel 81 has an inclined axle 83 carried by the torch holder, and the wheel slopes so that it contacts with the work adjacent the point at which the cutting jet strikes the work.

The wheel 81 is driven through worm and bevel gearing by a motor 84 carried by the torch holder. A collar 85 on the torch holder limits its downward movement when the driving wheel 81 is unsupported.

The torch 79 and wheel 81 are guided across the work by turning the collar 85 to steer the wheel 81. The axis of rotation of the torch holder 78 extends through the work midway between the cutting jet and point of contact of the wheel 81 on the work. The cutting jet is as close as practicable to the point at which the wheel 81 rests on the work, and thus both the cutting jet and point of contact of the wheel are substantially on the axis of rotation of the torch holder.

Fig. 7 is a diagrammatic view showing a driving wheel 88 having a horizontal axle and a dished rim portion so that the wheel contacts with the work adjacent the cutting jet of a torch 90. The torch 90 has an offset lower portion which extends into the recess of the wheel. The torch 90 and axle of the wheel 88 are connected to a common frame 92.

Fig. 8 shows a construction in which the axle is inclined as in Fig. 4, but a flat wheel 94 is used instead of a dished wheel.

Fig. 9 shows the wheel and axle construction of Fig. 4 with a torch 96 for making a bevel cut. The recess in the dished wheel provides a space for a portion of the torch 96, and this view illustrates one of the important advantages of the dished form of wheel. The torch 96 could not be successfully used with the flat wheel in Fig. 8. It would not be possible to bring the cutting jet of the torch 96 close to the wheel 94 because the upper portion of the tip would strike the wheel.

Fig. 10 shows the tip of a torch 98 offset to bring the cutting jet adjacent the point at which a wheel 100 contacts with the work 16. The wheel 100 is of heavy section to reinforce it against being warped by the heat of the torch.

The preferred embodiment and some modifications of the invention have been described. Other changes and modifications can be made and various features of the invention can be used alone or in combination with other features without departing from the invention as defined in the appended claims.

Fitted with a welding torch the machine becomes a very efficient means for welding straight or irregular seams.

I claim:

1. Cutting apparatus comprising a support, means including a traction wheel mounted to move in any direction over the surface of the work, a motor mounted on said support in driving relation to and movable with said traction wheel, and a torch supported on said support with the torch tip beside said traction wheel in position to direct a jet against the work substantially at the point where said traction wheel contacts with the work, so that the wheel travels along the edge of the cut as the support moves over the work.

2. Cutting apparatus comprising a support; a torch carried by the support; and a wheel on said support contacting with the surface of the work the wheel being dished so that its lower peripheral portion slopes toward the cutting jet.

3. Cutting apparatus comprising a carriage; a torch carried by the carriage; an axle on the carriage; and a wheel on the axle supporting the carriage for movement over the surface of the work, the axle being inclined upwardly on the torch side of the wheel so that the wheel is inclined to bring its lower portion toward the cutting jet.

4. In combination with a cutting torch; a carriage; a wheel for supporting the carriage for movement over the surface of the work, said wheel being dished away from the torch to provide a recess into which a portion of the torch can extend; and an axle connecting the wheel to the carriage, the axle being inclined with respect to the surface of the work so that the wheel is inclined and contacts with the work adjacent point at which the cutting jet strikes the work.

5. Motorized cutting apparatus comprising a carriage; wheels supporting the carriage for movement over the surface of the work; a motor on the carriage; driving connections between the motor and one of the wheels; and a torch holder for connecting a cutting torch to the carriage with the torch and wheel so related that one of them slopes toward the other so that the cutting jet and the bottom of the wheel are in close proximity.

6. Motorized cutting apparatus comprising a carriage; wheels supporting the carriage for movement over the surface of the work, one of the wheels being dished; a torch holder on the recess side of the dished wheel for holding a torch with the tip in position to direct a cutting jet against the surface of the work adjacent the point at which the dished wheel rests on the work; a motor supported by the carriage; and driving connections between the motor and one of the wheels supporting the carriage.

7. A metal cutting machine comprising a carriage supported by wheels contacting with the surface of the work, and one of which is connected with the carriage by an inclined axle so that the wheel is inclined at an angle to the surface of the work; a torch holder for supporting a torch in position to cut the work close to the point of support of the inclined wheel; a motor on the carriage; and driving connections between the motor and the inclined wheel.

8. A motorized cutting machine comprising a carriage; wheels supporting the carriage for movement over the surface of the work, one of said wheels being dished and having an inclined axle so that the periphery of the wheel is in a plane inclined with respect to the surface of the work; a torch on the recess side of the dished wheel and extending downwardly to direct a cutting jet against the work adjacent the point of contact of the dished wheel and the work; a motor on the carriage; and driving connections between the motor and the inclined wheel.

9. A metal cutting machine comprising a torch carriage; wheels supporting the carriage for movement over the surface of the work, said wheels including a driving wheel and two caster wheels; a motor on the carriage; power transmitting connections between the motor and the driving wheel; and a torch connected to the carriage, the driving wheel being dished so that its outer portion extends close to the torch tip and contacts with the work adjacent the point of contact of the cutting jet with the work.

10. Metal cutting apparatus comprising a torch carriage; a driving wheel and two caster wheels for supporting the carriage for movement over the work; means for holding a torch in position to direct a cutting jet against the work; a motor on the carriage; and power transmitting connections between the motor and the driving wheel, said driving wheel being connected to the carriage with an inclined axis so that the periphery of the driving wheel contacts with the work at substantially the point of attack of the cutting jet.

11. Metal cutting apparatus comprising a torch carriage; a cutting torch carried by the carriage; a wheel supporting the carriage on the work, said wheel contacting with the work close to the point at which the cutting jet strikes the work; and conical bearings connecting the wheel to the carriage, said bearings being of hard material which retains its hardness at high temperatures.

12. Cutting apparatus comprising a support; a wheel on said support for contacting with the surface of the work; and a torch carried by the support, a portion of said torch sloping downward toward the wheel so that the end of the torch directs a jet against the work adjacent the point of contact of the wheel on the work.

13. A metal cutting machine, comprising a pivoted arm; a torch holder supported by the arm and rotatable with respect to the arm; a wheel contacting with the work to be cut and supporting the torch holder in position to hold a torch in position to direct a cutting jet against the work; and an axle for the wheel inclined so that the lower portion of the wheel slopes toward the point at which the cutting jet strikes the work.

14. In a metal cutting machine, a pillar; a jointed arm pivotally connected with the pillar; a torch holder supported by the arm for universal movement in a plane, the torch holder being rotatable with respect to the arm and having a floating movement toward and from the work; a cutting torch in the holder; and a driving wheel connected to the holder and contacting with the work to support the torch and holder, the torch and wheel being so related that one of them slopes toward the other so that the wheel contacts with the work adjacent the point at which the cutting jet strikes the work.

15. Gas cutting apparatus including a carriage, means for supporting the carriage on the surface of the work including a motor-driven wheel, a torch-holder on the carriage, and a cutting torch offset toward the motor-driven wheel to direct a cutting jet against the work immediately adjacent the point of contact of said wheel on the work.

JAMES L. ANDERSON.